(12) United States Patent
Takeda et al.

(10) Patent No.: US 12,528,116 B2
(45) Date of Patent: Jan. 20, 2026

(54) NICKEL NANOWIRE AND METHOD FOR PRODUCING THE SAME

(71) Applicant: UNITIKA LTD., Osaka (JP)

(72) Inventors: Hirotaka Takeda, Uji (JP); Chikako Yamada, Uji (JP)

(73) Assignee: UNITIKA LTD., Osaka (JP)

( * ) Notice: Subject to any disclaimer, the term of this patent is extended or adjusted under 35 U.S.C. 154(b) by 440 days.

(21) Appl. No.: 17/923,686

(22) PCT Filed: May 17, 2021

(86) PCT No.: PCT/JP2021/018611
§ 371 (c)(1),
(2) Date: Nov. 7, 2022

(87) PCT Pub. No.: WO2021/235391
PCT Pub. Date: Nov. 25, 2021

(65) Prior Publication Data
US 2023/0347409 A1 Nov. 2, 2023

(30) Foreign Application Priority Data
May 18, 2020 (JP) .................................. 2020-086852
Aug. 13, 2020 (JP) .................................. 2020-136831

(51) Int. Cl.
| | |
|---|---|
| *B22F 1/05* | (2022.01) |
| *B22F 1/00* | (2022.01) |
| *B22F 1/054* | (2022.01) |
| *B22F 1/0545* | (2022.01) |
| *B22F 9/24* | (2006.01) |

(52) U.S. Cl.
CPC .............. *B22F 1/00* (2013.01); *B22F 1/0545* (2022.01); *B22F 1/0553* (2022.01); *B22F 9/24* (2013.01); *B22F 2301/15* (2013.01)

(58) Field of Classification Search
None
See application file for complete search history.

(56) References Cited

U.S. PATENT DOCUMENTS

| | | | | |
|---|---|---|---|---|
| 2016/0293968 | A1* | 10/2016 | Wong | ..................... H01M 4/928 |
| 2017/0314152 | A1* | 11/2017 | Choi | ......................... C25D 3/48 |
| 2019/0276948 | A1 | 9/2019 | Kim et al. | |
| 2023/0347411 | A1* | 11/2023 | Takeda | ..................... B22F 9/24 |

FOREIGN PATENT DOCUMENTS

| | | |
|---|---|---|
| CN | 103586479 A | 2/2014 |
| CN | 107377993 A | 11/2017 |
| CN | 110136981 A * | 8/2019 |

(Continued)

OTHER PUBLICATIONS

English translation of JP 2007284716 (originally published Nov. 1, 2007), obtained from PE2E search.*

(Continued)

*Primary Examiner* — George Wyszomierski
(74) *Attorney, Agent, or Firm* — Birch, Stewart, Kolasch & Birch, LLP

(57) ABSTRACT

The present invention provides a nickel nanowire, which is resistant to break by stress. The present invention relates to a nickel nanowire having a face-centered cubic lattice structure and a crystallite size in a direction of a (111) lattice plane of 10 nm or less.

12 Claims, 1 Drawing Sheet

Example 1

(56) References Cited

FOREIGN PATENT DOCUMENTS

| EP | 3 696 234 A1 | | 8/2020 |
|----|---|---|---|
| JP | 2007284716 A | * | 11/2007 |
| WO | WO 2019/073833 A1 | | 4/2019 |

OTHER PUBLICATIONS

English translation of CN 110136981 (originally published Aug. 16, 2019), obtained from Espacenet.*
Verissimo, C. et al., "Different Carbon Nanostructured Materials Obtained in Catalytic Chemical Vapor Deposition", Journal of the Brazilian Chemical Society, vol. 17, No. 6, pp. 1124-1132, Sep. 2006.*
Taiwanese Office Action and Search Report for Taiwanese Application No. 110117619, dated Jul. 22, 2024, with English translation.
International Preliminary Report on Patentability and an English translation of the Written Opinion of the International Searching Authority issued in the corresponding International Application No. PCT/JP2021/018611 on Dec. 1, 2022.
Wang et al., "Preparation and growth mechanism of nickel nanowires under applied magnetic field," Nano-Micro Letters, vol. 2, No. 2, 2010, pp. 134-138.
Japanese Office Action for Japanese Application No. 2022-524461, dated Mar. 25, 2025, with English translation.
Chinese Office Action and Search Report for Chinese Application No. 202180035239.0, dated Feb. 5, 2025, with English translation.
Chinese Office Action for Chinese Application No. 202180035239.0, dated Jul. 29, 2025, with English translation.

* cited by examiner

Example 1

Comparative Example 2

Comparative Example 4

NICKEL NANOWIRE AND METHOD FOR PRODUCING THE SAME

TECHNICAL FIELD

The present invention relates to a nickel nanowire and a method for producing the same.

BACKGROUND ART

Since nickel nanowires are ferromagnetic, the nickel nanowires can be used not only as conductive materials such as transparent conductive films or high-dielectric constant materials but also as magnetic materials such as electrical wave absorbers. The nanowires are characterized by exhibiting percolation and magnetic anisotropy due to the anisotropy (high aspect ratio) of the fibrous shape, and it is possible to obtain performance that cannot be obtained with particles (Patent Document 1).

For example, the nickel nanowires disclosed in Patent Document 1 are produced by reduction of one kind of nickel salt, and the crystallite size in the direction of the (111) lattice plane is more than 10 nm and 15 nm or less.

PRIOR ART DOCUMENT

Patent Document

Patent Document 1: WO 2019/073833 A

SUMMARY OF THE INVENTION

Problems to be Solved by the Invention

The inventors of the present invention have found that conventional nickel nanowires have a problem that they are likely to be broken by stress.

Specifically, in order to use the performance of the nickel nanowires as industrial products, it is necessary to mold and process the nickel nanowires into various shapes such as sheets and housings. In order to mold and process the nickel nanowires, it is necessary to mix the nickel nanowires with other substances and mold the mixture, but the nickel nanowires are sensitive to stress as with metal nanowires such as silver nanowires. Thus, there is a problem that when the nickel nanowires are mixed with other substances by kneading or the like and molded, the nickel nanowires are broken into particles by stress, anisotropy disappears, and expected performance (for example, magnetic properties such as magnetic anisotropy) cannot be exhibited.

The present invention has been made to solve the above problem, and an object thereof is to provide nickel nanowires, which are resistant to break by stress.

Means of Solving the Problems

The present inventors have found that the above object is achieved by controlling the crystallite size within a specific range, and have reached the present invention.

That is, the gist of the present invention is as follows.

<1> A nickel nanowire having a face-centered cubic lattice structure and a crystallite size in a direction of a (111) lattice plane of 10 nm or less.
<2> The nickel nanowire according to <1>, wherein the crystallite size in the direction of the (111) lattice plane is larger than a crystallite size in a direction of a (110) lattice plane.
<3> The nickel nanowire according to <2>, wherein the crystallite size in the direction of the (110) lattice plane is larger than a crystallite size in a direction of a (100) lattice plane.
<4> The nickel nanowire according to any one of <1> to <3>, having an average diameter of 50 nm or more and less than 1 μm.
<5> The nickel nanowire according to any one of <1> to <4>, having an average length of 5 μm or more.
<6> The nickel nanowire according to any one of <1> to <5>, having a saturation magnetization of 20 emu/g or more.
<7> The nickel nanowire according to any one of <1> to <6>, wherein the crystallite size in the direction of the (111) lattice plane is 1 to 8 nm.
<8> A dispersion comprising the nickel nanowire according to any one of <1> to <7>.
<9> A molded article comprising the nickel nanowire according to any one of <1> to <7>.
<10> A method for producing a nickel nanowire, comprising a step of reducing two or more kinds of nickel salts in a reaction solution while applying a magnetic field to obtain the nickel nanowire according to any one of <1> to <7>.
<11> The method for producing a nickel nanowire according to <10>, wherein the two or more kinds of nickel salts comprise nickel chloride and nickel sulfate salts, and a proportion of the nickel chloride to a total of the nickel chloride and the nickel sulfate salts is 70 to 98 mol %.
<12> The method for producing a nickel nanowire according to <10>, wherein the two or more kinds of nickel salts comprise nickel chloride and nickel acetate salts, and a proportion of the nickel chloride to a total of the nickel chloride and the nickel acetate salts is 70 to 98 mol %.
<13> The method for producing a nickel nanowire according to <10>, wherein the two or more kinds of nickel salts comprise nickel acetate and nickel sulfate salts, and a proportion of the nickel acetate to a total of the nickel acetate and the nickel sulfate salts is 70 to 98 mol %.

Effects of the Invention

According to the present invention, it is possible to provide nickel nanowires, which are resistant to break by stress. Even when the nickel nanowires of the present invention are mixed with other substances by kneading or the like and molded, the nickel nanowires are resistant to break by stress, and thus can be suitably used for various applications.

EMBODIMENTS OF THE INVENTION

[Nickel Nanowires]

Figure 1:
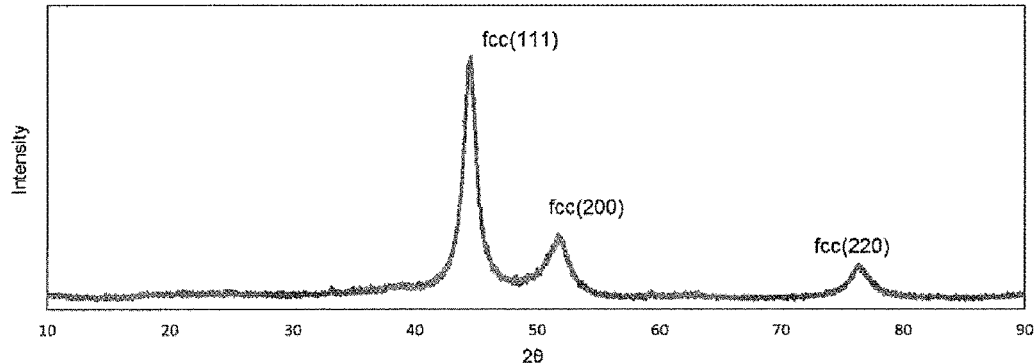
FIG. 1 is a diffraction pattern of a wide-angle X-ray diffraction (WAXD) measurement of nickel nanowires produced in Example 1.

The nickel nanowires of the present invention are required to have a face-centered cubic lattice structure (i.e. an fcc structure) as the crystal structure. The lattice structure (or crystal structure) can be analyzed by WAXD.

That the nickel nanowires have an fcc structure means that one or more (particularly three) main peaks unique to a so-called fcc type crystal structure are shown at a predetermined incident angle in X-ray diffraction under the following conditions. Examples of the main peaks unique to the fcc structure include a peak (111) at 2θ=44.4°, a peak (200) at 2θ=51.6 to 51.9°, and a peak (220) at 2θ=76.3°.

Conditions: Cu Kα ray=1.54 Å, 50 kV, 300 mA, 2θ/θ method.

The nickel nanowires of the present invention need not strictly have only the fcc structure as a crystal structure, and may contain other crystal structures (for example, hexagonal closest packing structure (i.e. hcp structure)). For example, the nickel nanowires of the present invention mainly have an fcc structure and may contain an hcp structure.

The content ratio (hcp/fcc) of the hcp structure of the nickel nanowires of the present invention is usually 0.15 or less, and from the viewpoint of magnetic properties, it is preferably 0.1 or less, and more preferably 0. The content ratio (hcp/fcc) of the hcp structure is a ratio of the hcp structure to the fcc structure in the nickel nanowires. Specifically, in the diffraction pattern of a wide-angle X-ray diffraction measurement (WAXD, Cu Kα ray=1.54 Å, 50 kV, 300 mA, 2θ/θ method), the content ratio of the hcp structure is a value calculated by a ratio (hcp (010)/fcc (200)) of an integral value of a peak (010) at 2θ=37.2° in the hcp structure to an integral value of a peak (200) at 2θ=51.6 to 51.9° in the fcc structure.

As the crystallite size of the nickel nanowires is smaller, the sliding action is more likely to occur at the crystallite grain boundary, so that the stress applied to the nickel nanowires is more likely to be relaxed at the crystallite grain boundary. On the other hand, as the crystallite size is larger, the sliding action is less likely to work at the crystallite grain boundary, whereby the applied stress is less likely to be relaxed at the crystallite grain boundary. Thus, in order to make the nickel nanowires resistant to break by stress, it is required to increase the number of places where stress can be relaxed by sliding of the crystallite grain boundary. For this reason, the crystallite size of the nickel nanowires is preferably small. Specifically, it is necessary that the crystallite size in the direction of the (111) lattice plane be 10 nm or less, and from the viewpoints of more sufficient stress relaxation and excellent magnetic properties, the crystallite size is preferably 1 to 10 nm, more preferably 1 to 9 nm, still more preferably 1 to 8 nm, particularly preferably 5 nm or more and 8 nm or less, and most preferably more than 5 nm and 8 nm or less. If the crystallite size in the direction of the (111) lattice plane is too large, the stress is not sufficiently relaxed, whereby the nickel nanowires are likely to be broken by the stress. In addition, magnetic properties may be deteriorated. In consideration of a process in which fine nickel nuclei as crystal nuclei are generated from nickel ions and grow into nanowires, it is not realistic that the crystallite size is less than or equal to the crystal nuclei (1 to 5 nm). In order to make the crystallite size in the direction of the (111) lattice plane 10 nm or less, as described later, nickel nanowires can be obtained using two or more kinds of nickel salts by reducing the nickel salts in a reaction solution under application of a magnetic field while adjusting the dissociation constant of each nickel salt, the size of the counter ions, the coordination state, the amount of crystal nuclei, the production time of the nanowires, and the timing of growing into the nanowires. The direction of the (111) lattice plane is a direction perpendicular to the (111) lattice plane.

The nickel nanowires have different magnetic properties depending on the direction of the lattice plane. In nickel, the direction of the (111) lattice plane is the most easily magnetized direction, the direction of the (110) lattice plane is the second most easily magnetized direction, and the direction of the (100) lattice plane is the last easily magnetized direction. For use as a magnetic material, it is more advantageous as the crystallite size in the direction of the (111) lattice plane is larger. Thus, in order to use the nickel nanowires as magnetic materials, the crystallite size in the direction of the (111) lattice plane is preferably larger than the crystallite size in the direction of the (110) lattice plane, and further, the crystallite size in the direction of the (110) lattice plane is more preferably larger than the crystallite size in the direction of the (100) lattice plane.

The crystallite size in the direction of the (110) lattice plane in the nickel nanowires of the present invention is usually 8.0 nm or less (particularly 1.0 to 8.0 nm), and from the viewpoints of more sufficient stress relaxation and excellent magnetic properties, the crystallite size is preferably 4.0 to 7.8 nm, more preferably 4.8 nm or more and 7.8 nm or less, and still more preferably 5.3 nm or more and 6.0 nm or less.

The crystallite size in the direction of the (100) lattice plane in the nickel nanowires of the present invention is usually 7.0 nm or less (particularly 0.8 to 7.0 nm), and from the viewpoints of more sufficient stress relaxation and excellent magnetic properties, the crystallite size is preferably 2.0 to 6.4 nm, more preferably 3.0 nm or more and 5.4 nm or less, and still more preferably 3.0 nm or more and 4.5 nm or less.

In the present specification, the crystallite size in the direction of each lattice plane is a value calculated from the peaks of WAXD. In the case of fcc nickel, since the reflections of the (100) lattice plane and the (110) lattice plane cannot be directly observed due to the extinction rule, values calculated from the peaks of the (200) lattice plane and the (220) lattice plane are used, respectively.

Generally, a nanowire is a fibrous substance having a nanoscale average diameter. In addition, the average diameter of the nickel nanowires of the present invention is always larger than the crystallite size in the direction of each lattice plane. In the present invention, the average diameter of the nickel nanowires is preferably 50 nm or more and less than 1 μm, more preferably 50 to 500 nm, still more preferably 70 to 200 nm, particularly preferably 90 to 200 nm, and most preferably 90 to 150 nm from the viewpoints of handling, more sufficient stress relaxation, and excellent magnetic properties.

In the present specification, as the average diameter of the nickel nanowires, the average value of the nickel nanowire diameters at arbitrary 100 points in 10 fields of view by a transmission electron microscope (magnification 600,000) is used.

The average length of the nickel nanowires is preferably 5 μm or more (particularly 5 to 50 μm), and more preferably 10 to 30 μm, from the viewpoint of mixing with other substances by kneading or the like and from the viewpoints of handleability, stress relaxation, and magnetic properties.

In the present specification, as the average length of the nickel nanowires, the average value of lengths of arbitrary 200 nickel nanowires obtained by scanning electron microscopy (magnification 2,000 to 6,000) is used.

The aspect ratio (average length/average diameter) of the nickel nanowires of the present invention is usually 50 or more, and from the viewpoint of magnetic properties, it is preferably 100 or more, more preferably 150 or more, still more preferably 200 or more, and particularly preferably 250 or more. The upper limit value of the aspect ratio is not particularly limited, and the aspect ratio is usually 400 or less, and particularly 300 or less.

The nickel nanowires of the present invention are ferromagnetic and have a saturation magnetization of 20 emu/g or more. From the viewpoint of further improving the magnetic properties, the saturation magnetization of the nickel nanowires of the present invention is preferably 30 emu/g or more, more preferably 40 emu/g or more, and still more preferably 45 emu/g or more. The upper limit value of the saturation magnetization is not particularly limited, and the saturation magnetization is usually 60 emu/g or less, and particularly 55 emu/g or less.

In the present specification, the saturation magnetization can be measured by a vibrating sample magnetometer (VSM) as described later. In particular, nickel nanowires with a content ratio of the hcp structure of more than 0.1 (particularly more than 0.15) do not have sufficient magnetic properties and have a saturation magnetization of less than 20 emu/g.

[Method for Producing Nickel Nanowires]

The nickel nanowires of the present invention can be obtained using two or more kinds of nickel salts by reducing the nickel salts in a reaction solution under application of a magnetic field while adjusting the dissociation constant of the nickel salts, the size of the counter ions, the amount of crystal nuclei, the production time of the nanowires, and the timing of growing into the nanowires. Conventionally, a control technique for reducing the crystallite size of nickel nanowires has not been known. In the present invention, by using two or more kinds of nickel salts, nickel nanowires having a relatively small crystallite size can be obtained as compared with the case of using a single nickel salt, and the crystallite size can be controlled in a wide range.

Examples of the nickel salt include nickel chloride, nickel sulfate, nickel nitrate, and nickel acetate. The salt may be a hydrate or an anhydride. Among these nickel salts, two or more (particularly two) kinds of nickel salts having different dissociation constants and/or counter ions are used. As the combination of nickel salts, a combination of nickel salts having a large difference in dissociation constant and/or a combination of nickel salts having a large difference in counter ion size is preferable. Such combinations include a combination of nickel chloride and nickel sulfate (hereinafter, sometimes referred to as a combination A), a combination of nickel chloride and nickel acetate (hereinafter, sometimes referred to as a combination B), and a combination of nickel acetate and nickel sulfate (hereinafter, sometimes referred to as a combination C). Among them, the combination A of nickel chloride and nickel sulfate is more preferable from the viewpoints of reducing the crystallite size (particularly, the crystallite size in the direction of the (111) lattice plane) and improving the magnetic properties.

The preferred total concentration of the nickel salts in the reaction solution greatly varies depending on the kinds of nickel salts to be used, the kind of solvent, and the reaction temperature. When the total concentration is too high, nanowires cannot be formed. When the total concentration is too low, production efficiency tends to be deteriorated. The total concentration of the nickel salts in the reaction solution is preferably 0.01 to 1 mmol/g, more preferably 0.015 to 0.25 mmol/g, and still more preferably 0.015 to 0.030 mmol/g from the viewpoints of reducing the crystallite size (particularly, the crystallite size in the direction of the (111) lattice plane) and improving the magnetic properties.

The preferred concentration ratio of each nickel salt in the reaction solution greatly varies depending on the dissociation constant of the nickel salts to be used and the like. In each combination of nickel salts, the following concentration ratio is preferable from the viewpoints of reducing the crystallite size (particularly, the crystallite size in the direction of the (111) lattice plane) and improving the magnetic properties.

(1A) When the nickel salts are used in the combination A of nickel chloride and nickel sulfate salts, the proportion of the nickel chloride to the total of the nickel chloride and the nickel sulfate salts is preferably 70 to 98 mol %, preferably 70 to 95 mol %, and more preferably 85 to 95 mol %. When the proportion is 50 mol % or more and less than 70 mol %, the nanowires may not be formed, and the product may in a particulate form. When the proportion is less than 50 mol %, the crystallite size in the direction of the (111) lattice plane in the nanowires increases.

(1B) When the nickel salts are used in the combination B of nickel chloride and nickel acetate salts, the proportion of the nickel chloride to the total of the nickel chloride and the nickel acetate salts is preferably 70 to 98 mol %, preferably 70 to 95 mol %, and more preferably 85 to 95 mol %. When the proportion is 50 mol % or more and less than 70 mol %, the nanowires may not be formed, and the product may in a particulate form. When the proportion is less than 50 mol %, the crystallite size in the direction of the (111) lattice plane in the nanowires increases.

(1C) When the nickel salts are used in the combination C of nickel acetate and nickel sulfate salts, the proportion of the nickel acetate to the total of the nickel acetate and the nickel sulfate salts is preferably 70 to 98 mol %, preferably 70 to 95 mol %, and more preferably 85 to 95 mol %. When the proportion is 50 mol % or more and less than 70 mol %, the nanowires may not be formed, and the product may in a particulate form. When the proportion is less than 50 mol %, the crystallite size in the direction of the (111) lattice plane in the nanowires increases.

The solvent used in the reaction solution is not particularly limited, but a highly polar solvent such as water, alcohol, or NMP, or a glycol-based solvent having a high boiling point and high polarity such as ethylene glycol or propylene glycol is preferable because the nickel salts are easily dissolved.

The reducing agent for reducing the nickel salts is not particularly limited, and hydrazine monohydrate (hydrazine) is preferable from the viewpoints of reducing the crystallite size (particularly, the crystallite size in the direction of the (111) lattice plane) and improving the magnetic properties. Phosphorus-based and borane-based reducing agents such as hypophosphorous acid and dimethylamine borane, which are typical reducing agents for electroless nickel plating, reduce the crystallinity itself of the metal because phosphorus and boron become impurities in the metal.

Since this may lead to a case where the nanowires cannot be formed or a case where the magnetic properties of the obtained nickel nanowires are deteriorated, these reducing agents are not preferable. In addition, organic reducing agents such as glycol and ascorbic acid are not preferable because they require a high temperature of 200° C. or more, and therefore the magnetic field and the state (temperature, boiling, etc.) of the solvent used in the reaction are not stable.

When hydrazine monohydrate is used as the reducing agent, the molar amount of hydrazine monohydrate is preferably 1.1 to 2.0 times, more preferably 1.2 to 1.8 times the total amount of nickel salts. When the molar amount of hydrazine monohydrate is less than 1.1 times the total amount of nickel salts, unreacted nickel salts remain and efficiency is poor. On the other hand, when the molar amount is more than 2.0 times, the reaction becomes too active, and the reaction solution may generate bubbles, which may inhibit formation of the nanowires.

When the nickel salts are reduced with hydrazine monohydrate, the reaction temperature and liquid properties in the reduction reaction are important. When the reaction temperature is too high, the reaction system becomes unstable due to bubbling by the generated gas. When the reaction temperature is too low, the reduction reaction itself tends not to occur. The reaction temperature is preferably equal to or lower than the boiling point (114° C.) of hydrazine at normal pressure. From the viewpoints of adjustment of the reaction temperature and the amount of generated gas and convective diffusion, it is preferred that the reaction temperature be 80 to 100° C., particularly 80 to 95° C. When the reaction temperature is 80 to 100° C., particularly 80 to 95° C., the liquid property is preferably alkaline. In order to make the liquid property alkaline, it is preferable to use a hydroxide salt such as sodium hydroxide. However, depending on the concentration of the hydroxide salt, precipitation of insoluble nickel hydroxide may occur. In that case, precipitation can be suppressed by using sodium hydroxide and ammonia in combination. When sodium hydroxide is used, the concentration of sodium hydroxide in the reaction solution is preferably 0.020 to 1 mmol/g (particularly 0.025 to 1 mmol/g), more preferably 0.020 to 0.5 mmol/g (particularly 0.025 to 0.5 mmol/g). Ammonia redissolves nickel hydroxide precipitates by ammine complexation. The amount of ammonia to be added is not particularly limited, but ammonia in an excessive amount with respect to nickel hydroxide is required for redissolution, whereas the excessive amount of ammonia makes the reaction system unstable due to endotherm by heat of vaporization. Thus, the content is usually preferably in the range of 3 to 30 mol with respect to 1 mol of sodium hydroxide. From the viewpoints of reducing the crystallite size (particularly, the crystallite size in the direction of the (111) lattice plane) and improving the magnetic properties, the content is more preferably in the range of 10 to 30 mol, and still more preferably in the range of 10 to 20 mol. Ammonia is preferably added as aqueous ammonia from the viewpoints of availability, management, and the like. The amount of ammonia to be added to 1 mol of sodium hydroxide may be within the above range in the reaction solution.

A complexing agent such as citrate may be added to the reaction solution. The addition of the complexing agent tends to increase the amount of crystal nuclei and reduce the crystallite size of the nickel nanowires. The concentration of the complexing agent is preferably 1 to 20 mol %, more preferably 5 to 15 mol %, and still more preferably 5 to 10 mol % with respect to the total number of moles of the nickel salts from the viewpoints of reducing the crystallite size (particularly, the crystallite size in the direction of the (111) lattice plane) and improving the magnetic characteristics. When the concentration of the complexing agent is too high, the reduction reaction is less likely to occur, and the production efficiency may be reduced.

The reaction is carried out in a magnetic field. The central magnetic field is preferably 10 to 200 mT, and more preferably 80 to 180 mT. When no magnetic field is applied during the reaction, nickel nanowires cannot be produced.

The reduction time of the reduction reaction is not particularly limited as long as the nickel nanowires are produced, but it is usually 1 hour or less, and preferably about 10 to 40 minutes. Crystal nuclei that affect the crystallite size are formed within a few minutes and crystallites grow into nanowires in about 10 minutes. It is presumed that the size of the crystal nucleus is determined by a plurality of factors such as the structure and concentration of the salts of the raw materials.

After the reduction reaction, when purification and collection by centrifugation, filtration, attraction with a magnet, or the like are performed, the nickel nanowires can be obtained. After the reaction, ammonia may be added prior to collection of the nickel nanowires. As a result, precipitates of nickel hydroxide formed as a by-product can be dissolved, and impurities can be easily removed.

[Dispersion, Coating Material, Paste, and Molded Article]

A dispersion can be formed by dispersing the nickel nanowires of the present invention in a medium such as water, an organic solvent, or a mixed solvent thereof, and/or a curable resin. As the organic solvent, any organic solvent conventionally used as a medium of a nanowire dispersion can be used, and examples thereof include acetone, isobutyl alcohol, isopropyl alcohol, isopentyl alcohol, ethanol, ethyl ether, ethylene glycol, ethylene glycol monoethyl ether, ethylene glycol monoethyl ether acetate, ethylene glycol mono-n-butyl ether, ethylene glycol monomethyl ether, dichlorobenzene, xylene, cresol, chlorobenzene, isobutyl acetate, isopropyl acetate, isopentyl acetate, ethyl acetate, ethylene glycol n-butyl ether acetate, n-propyl acetate, n-pentyl acetate, methyl acetate, cyclohexanol, cyclohexanone, N,N-dimethylformamide, tetrahydrofuran, 1,1,1-trichloroethane, toluene, n-hexane, propylene glycol, 1-butanol, 2-butanol, methanol, methyl ethyl ketone, methyl cyclohexanol, methyl cyclohexanone, and methyl n-butyl ketone. Examples of the curable resin include acrylic resins, epoxy resins, silicone resins, and phenol resins.

The content of the nickel nanowires in the dispersion is not particularly limited, and may be, for example, 0.01 to 50 parts by mass, particularly 0.1 to 10 parts by mass with respect to 100 parts by mass of the medium.

By mixing the dispersion containing the nickel nanowires of the present invention with a binder resin or with a curing agent that cures a curable resin, it can be used as a coating material, an adhesive, or a molding material. In addition, a leveling agent, a wetting agent, an antifoaming agent, an inorganic filler for the purpose of thermal conduction, and the like can be added to the dispersion.

Examples of the binder resin and the curable resin include acrylic resins, urethane resins, epoxy resins, silicone resins, and phenol resins. Examples of the curing agent include aldehyde, amine, isocyanate, imidazole, carboxylic acid, acid anhydride, hydrazide, and formaldehyde-based compounds.

The dispersion, the coating material, and the paste containing the nickel nanowires of the present invention can be used for coating and the like as conventionally performed. The coating film is a conductor or a high-dielectric constant material, and is suitable for electric wiring, an electrode material, an electrical wave shielding material, an antenna substrate, an electrical wave absorber, and the like.

Since the nickel nanowires of the present invention are more resistant to break by stress than conventional nickel nanowires, a molded article can also be formed by mixing, melting, and kneading the nickel nanowires of the present invention with other substances (for example, a polymer) and molding the mixture. Examples of other substances include polymers (particularly thermoplastic polymers) similar to the binder resin described above. The method for mixing, melting, and kneading with other substances is not particularly limited, and examples thereof include methods for mixing, melting, and kneading with a mixer, a screw type extruder, and the like. The molding method is also not particularly limited, and examples thereof include press molding and injection molding.

In particular, a sheet-shaped molded article obtained by mixing, melting, kneading, and molding the nickel nanowires of the present invention with a binder resin is useful as electric wiring, an electrode material, an electrical wave shielding material, an antenna substrate, an electrical wave absorber, and the like.

EXAMPLES

Hereinafter, the present invention will be described with reference to the examples, but the present invention is not limited by these inventions. Physical properties of the nickel nanowires were measured by the following methods.

(1) Average Diameter

The obtained nanowires were dispersed in ethanol, thinly applied onto a grid with a supporting film, and dried. The obtained sample was photographed at a magnification of 600,000 using a transmission electron microscope. The diameters of the nickel nanowires at arbitrary 100 points in 10 fields of view were measured, and the average value was calculated.

(2) Average Length

The sample applied and dried onto the sample stage in the same manner as in (1) was photographed at a magnification of 2,000 to 6,000 using a scanning electron microscope. The lengths of 200 arbitrary nickel nanowires were measured, and the average value was calculated.

(3) Crystal Structure

The obtained nickel nanowires were applied onto a glass sample plate, and a wide-angle X-ray diffraction (WAXD) measurement was performed. The crystal structure was identified from the diffraction pattern. The measurement conditions were Cu Kα ray, 50 kV, 300 mA, and 2θ/θ method.

Figure 2:
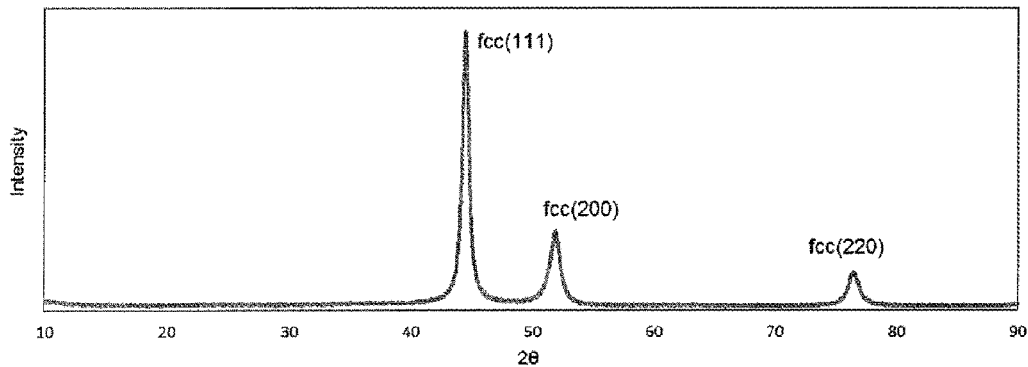
FIG. 2 is a diffraction pattern of WAXD of nickel nanowires produced in Comparative Example 2.

Specifically, a face-centered cubic lattice structure (fcc) was identified by the presence of a peak at 2θ=44.4°, a peak at 2θ=51.6 to 51.9°, and a peak at 2θ=76.3° in the diffraction pattern (for example, FIG. 1 and FIG. 2). FIG. 1 and FIG. 2 are diffraction patterns of wide-angle X-ray diffraction (WAXD) measurements of nickel nanowires produced in Example 1 and Comparative Example 2, respectively.

Figure 3:
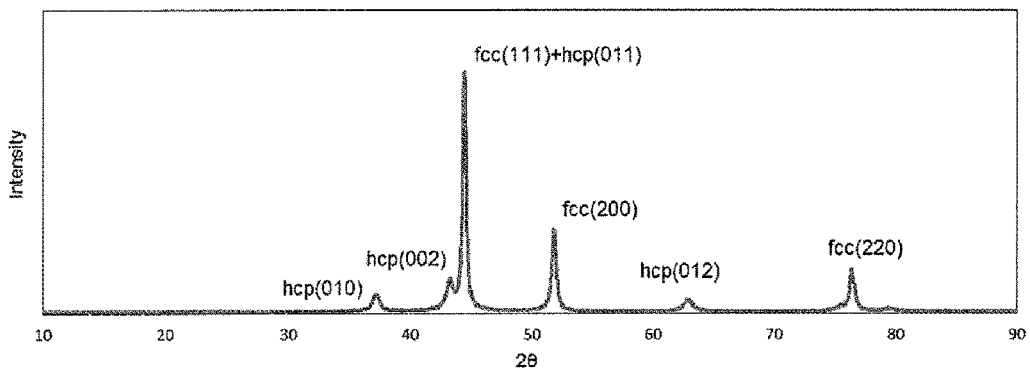
FIG. 3 is a diffraction pattern of WAXD of nickel nanowires produced in Comparative Example 4.

On the other hand, a hexagonal closest packing structure (hcp) was identified by the presence of a peak at 2θ=37.2°, a peak at 2θ=43.2°, and a peak at 2θ=62.8° (for example, FIG. 3). FIG. 3 is a diffraction pattern of a wide-angle X-ray diffraction (WAXD) measurement of nickel nanowires produced in Comparative Example 4. When there were peaks of both the crystal structures, it was assumed that both the crystal structures were formed.

From the diffraction pattern, the ratio of the hexagonal closest packing structure (hcp) to the face-centered cubic lattice structure (fcc) was calculated. Specifically, the ratio (hcp (010)/fcc (200)) of the integral value of the peak (010) at 2θ=37.2° in the hexagonal closest packing structure to the integral value of the peak (200) at 2θ=51.6 to 51.9° in the face-centered cubic lattice structure was determined.

(4) Crystallite Size

From the diffraction pattern obtained by WAXD, multiple peaks were separated by JADE software, the corrected half width B (rad) of each of the peaks corresponding to (111), (220), and (200) was obtained from Equation (1), and the crystallite size in the direction in each lattice was obtained from Scherrer's Equation (2). Specifically, the corrected half width B was determined by Equation (1) using 1.3 as a value of the deconvolution constant and 0.1 as a value of the device constant, and the crystallite size was determined by Equation (2) using 0.9 as a value of the constant K, 1.5406 (the wavelength of the X-ray of Cu Kα1 used) as a value of λ, β as a value of the corrected half width, and θ as a value of the diffraction angle.

The measurement conditions by WAXD were as follows: Cu Kα ray=1.54 Å, 50 kV, 300 mA, 2θ/θ method.

[Equation 1]

$$\beta^{1.3}=(\text{measured halfwidth})^{1.3}-0.1^{1.3} \quad (1)$$

$$\text{Crystallite size (nm)}=0.1\times(K\times\lambda)/(\beta\times\cos\theta) \quad (2)$$

⊙: 8 nm or less (excellent);
○: More than 8 nm and 9 nm or less (good);
Δ: More than 9 nm and 10 nm or less (pass);
x: Greater than 10 nm (fail).

(5) Magnetic Properties

The obtained nanowires were filled in a sample holder, and the saturation magnetization (emu/g) was measured with a vibrating sample magnetometer (VSM).

⊙⊙: 45 emu/g or more (best);
⊙: 40 mu/g % or more and less than 45 mu/g (excellent);
○: 30 mu/g or more and less than 40 mu/g (good);
Δ: 20 mu/g or more and less than 30 mu/g (pass);
x: Less than 20 mu/g (fail).

(6) Susceptibility to Cut Due to Stress

The obtained nickel nanowires of 1 g were dispersed in 50 g of ethylene glycol and treated with ultrasonic waves of 42 kHz for 2 minutes, and the susceptibility to cut (breakage) of the nanowires under such stress was evaluated. The retention rate was calculated from the average length of the treated nickel nanowires, and evaluation was performed according to the following criteria.

In the present invention, "Δ" or more is regarded as pass, and "⊙" is preferable.

⊙: 90% or more (excellent);
○: 70% or more and less than 90% (good);
Δ: 50% or more and less than 70% (pass);
x: Less than 50% (fail).

Example 1

To ethylene glycol, 3.61 g (15.2 mmol) of nickel chloride hexahydrate, 0.442 g (1.68 mmol) of nickel sulfate hexahydrate, and 0.375 g (1.27 mmol) of trisodium citrate dihydrate were added to make a total amount of 500 g. This solution was heated to 90° C. to allow dissolution.

In another container, 1.00 g (25.0 mmol) of sodium hydroxide was added to ethylene glycol to make a total amount of 499 g. The solution was heated to 90° C. to allow complete dissolution, after which 1.00 g (20.0 mmol) of hydrazine monohydrate was added.

The above two solutions were mixed, placed in a magnetic circuit capable of applying a magnetic field of 150 mT at the center, and subjected to a reduction reaction for 15 minutes while being maintained at 90 to 95° C.

After the reaction, 25 g (ammonia amount: 7 g (=411.8 mmol)) of 28% aqueous ammonia was added, and nickel nanowires were collected by filtration.

Examples 2 to 6 and Comparative Examples 1 to 4

The nickel nanowires were collected by performing the same operation as in Example 1 except that the kind and the amount used of the nickel salts were changed to the amounts shown in Table 1.

Example 7

To ethylene glycol, 3.61 g (15.2 mmol) of nickel chloride hexahydrate, 0.442 g (1.68 mmol) of nickel sulfate hexahydrate, and 0.375 g (1.27 mmol) of trisodium citrate dihydrate were added to make a total amount of 500 g. This solution was heated to 90° C. to allow dissolution.

In another container, 1.00 g (25.0 mmol) of sodium hydroxide was added to ethylene glycol to make a total amount of 499 g. This solution was heated to 90° C. to allow complete dissolution, after which 25 g of 28% aqueous ammonia (ammonia amount 7 g (=411.8 mmol)) and 1.00 g of hydrazine monohydrate (20.0 mmol) were added in this order.

The above two solutions were mixed, placed in a magnetic circuit capable of applying a magnetic field of 150 mT at the center, and subjected to a reduction reaction for 15 minutes while being maintained at 90 to 95° C.

After the reaction, the nickel nanowires were collected by filtration.

Comparative Example 5

Although it was attempted to obtain nickel nanowires by performing the same operation as in Example 1 except that the amounts of nickel chloride hexahydrate and nickel sulfate hexahydrate used were changed to the amounts shown in Table 1, the nanowires could not be obtained because the concentrations of nickel chloride hexahydrate and nickel sulfate hexahydrate were equimolar concentrations.

TABLE 1

| | | | | | | Example 1 | Example 2 | Example 3 | Example 4 | Example 5 |
|---|---|---|---|---|---|---|---|---|---|---|
| Production conditions | Nickel salt | Nickel salt (1) | Kind | | | Nickel chloride | Nickel chloride | Nickel chloride | Nickel chloride | Nickel chloride |
| | | | Concentration | mmol/g | | 0.0152 | 0.0161 | 0.0121 | 0.0152 | 0.0152 |
| | | Nickel salt (2) | Kind | | | Nickel sulfate | Nickel sulfate | Nickel sulfate | Nickel sulfate | Nickel acetate |
| | | | Concentration | mmol/g | | 0.0016 | 0.0007 | 0.0047 | 0.0016 | 0.0016 |
| | | | Proportion of nickel salt (1) | mol % | | 90 | 96 | 72 | 90 | 90 |
| | Complexing agent | Trisodium citrate | | mmol/g | | 0.00127 | 0.00127 | 0.00127 | — | 0.00127 |
| | | Proportion to total nickel salt | | mol % | | 7.6 | 7.6 | 7.6 | — | 7.6 |
| Evaluation | (1) Average diameter | | | nm | | 95 | 109 | 133 | 103 | 97 |
| | (2) Average length | | | μm | | 25 | 22 | 16 | 21 | 23 |
| | (aspect ratio) | | | — | | (263) | (202) | (120) | (204) | (237) |
| | (3) Crystal structure (hcp/fcc) | | | | | fcc (<0.1) | fcc (<0.1) | fcc (<0.1) | fcc (<0.1) | fcc (<0.1) |
| | (4) Crystallite size | 111 | | nm | | 7.2⊙ | 9.6Δ | 8.1○ | 9.1Δ | 9.7Δ |
| | | 100 | | nm | | 3.7 | 5.5 | 4.8 | 5.5 | 6.2 |
| | | 110 | | nm | | 5.4 | 6.7 | 5.2 | 6.4 | 7.7 |
| | (5) Magnetic properties | Saturation magnetization | | emu/g | | 47⊙⊙ | 42⊙ | 36○ | 40⊙ | 45⊙⊙ |
| | (6) Susceptibility to cut due to stress | Average length after treatment | | μm | | 24 | 18 | 12 | 18 | 20 |
| | | Retention rate after treatment | | % | | 96 | 81 | 75 | 86 | 87 |
| | | Evaluation | | | | ⊙ | ○ | ○ | ○ | ○ |

| | | | | | | Example 6 | Example 7 | Comparative example 1 | Comparative example 2 |
|---|---|---|---|---|---|---|---|---|---|
| Production conditions | Nickel salt | Nickel salt (1) | Kind | | | Nickel acetate | Nickel chloride | Nickel chloride | Nickel chloride |
| | | | Concentration | mmol/g | | 0.0152 | 0.0152 | 0.0168 | 0.0168 |
| | | Nickel salt (2) | Kind | | | Nickel sulfate | Nickel sulfate | — | — |
| | | | Concentration | mmol/g | | 0.0016 | 0.0016 | — | — |
| | | | Proportion of nickel salt (1) | mol % | | 90 | 90 | — | — |
| | Complexing agent | Trisodium citrate | | mmol/g | | 0.00127 | 0.00127 | 0.00127 | — |
| | | Proportion to total nickel salt | | mol % | | 7.6 | 7.6 | 7.6 | — |
| Evaluation | (1) Average diameter | | | nm | | 110 | 96 | 94 | 118 |
| | (2) Average length | | | μm | | 18 | 27 | 24 | 21 |
| | (aspect ratio) | | | — | | (164) | (281) | (255) | (178) |
| | (3) Crystal structure (hcp/fcc) | | | | | fcc (<0.1) | fcc (<0.1) | fcc (<0.1) | fcc (<0.1) |
| | (4) Crystallite size | 111 | | nm | | 10.0Δ | 7.2⊙ | 11.6X | 14.9X |
| | | 100 | | nm | | 5.8 | 3.7 | 6.8 | 9.0 |
| | | 110 | | nm | | 7.1 | 5.4 | 8.0 | 10.3 |
| | (5) Magnetic properties | Saturation magnetization | | emu/g | | 44⊙ | 48⊙⊙ | 35○ | 43⊙ |
| | (6) Susceptibility to cut due to stress | Average length after treatment | | μm | | 15 | 25 | 10 | 5 |
| | | Retention rate after treatment | | % | | 83 | 96 | 42 | 24 |
| | | Evaluation | | | | ○ | ⊙ | X | X |

TABLE 1-continued

|  |  |  |  |  | Comparative example 3 | Comparative example 4 | Comparative example 5 |
|---|---|---|---|---|---|---|---|
| Production conditions | Nickel salt | Nickel salt (1) | Kind | | Nickel acetate | Nickel sulfate | Nickel chloride |
|  |  |  | Concentration | mmol/g | 0.0168 | 0.0168 | 0.0084 |
|  |  | Nickel salt (2) | Kind | | — | — | Nickel sulfate |
|  |  |  | Concentration | mmol/g | — | — | 0.0084 |
|  |  |  | Proportion of nickel salt (1) | mol % | — | — | 50 |
|  | Complexing agent | Trisodium citrate | | mmol/g | 0.00127 | 0.00127 | 0.00127 |
|  |  | Proportion to total nickel salt | | mol % | 7.6 | 7.6 | 7.6 |
| Evaluation | (1) Average diameter | | | nm | 106 | 57 | Particulate form |
|  | (2) Average length (aspect ratio) | | | μm | 25 (236) | 7 (123) | Particulate form (1 to 2) |
|  | (3) Crystal structure (hcp/fcc) | | | | fcc (<0.1) | fcc + hcp (0.17) | — |
|  | (4) Crystallite size | | 111 | nm | 11.0X | 39.3X | — |
|  |  | | 100 | nm | 6.5 | 32.2 | — |
|  |  | | 110 | nm | 8.1 | 40.9 | — |
|  | (5) Magnetic properties | Saturation magnetization | | emu/g | 44⊙ | 19X | — |
|  | (6) Susceptibility to cut due to stress | Average length after treatment | | μm | 6 | 3 | — |
|  |  | Retention rate after treatment | | % | 24 | 43 | — |
|  |  | Evaluation | | | X | X | — | fcc: Face-centered cubic lattice structure, hcp: Hexagonal closest packing structure, "—" means not added, not measured, or not evaluated.

The nickel nanowires of Examples 1 to 7 had a crystal structure of fcc and a crystallite size of 10 nm or less in the direction of the (111) lattice plane. Thus, even when stress was applied to the nanowires, the average length was retained, and the retention rate was 50% or more.

In particular, in the nickel nanowires of Examples 1 and 7, since the crystallite size in the direction of the (111) lattice plane was in a more preferable range of 1 to 8 nm (particularly more than 5 nm and 8 nm or less), even when stress was applied to the nanowires, the average length was almost retained, and the retention rate was 90% or more.

Since the nickel nanowires of Comparative Examples 1 to 4 were produced using one kind of nickel salt, the crystallite size in the direction of the (111) lattice plane was more than 10 nm. Thus, when stress was applied to the nanowires, the average length was shortened, and the retention rate was less than 50%.

INDUSTRIAL APPLICABILITY

The nickel nanowires of the present invention are conductors or high-dielectric constant materials, and are suitable for electric wiring, electrode materials, electrical wave shielding materials, antenna substrates, electrical wave absorbers, and the like.

The invention claimed is:

1. A nickel nanowire having a face-centered cubic lattice structure and a crystallite size in a direction of a (111) lattice plane of 10 nm or less, and having a saturation magnetization of 20 emu/g or more.

2. The nickel nanowire according to claim 1, wherein the crystallite size in the direction of the (111) lattice plane is larger than a crystallite size in a direction of a (110) lattice plane.

3. The nickel nanowire according to claim 2, wherein the crystallite size in the direction of the (110) lattice plane is larger than a crystallite size in a direction of a (100) lattice plane.

4. The nickel nanowire according to claim 1, having an average diameter of 50 nm or more and less than 1 μm.

5. The nickel nanowire according to claim 1, having an average length of 5 μm or more.

6. The nickel nanowire according to claim 1, wherein the crystallite size in the direction of the (111) lattice plane is 1 to 8 nm.

7. A dispersion comprising the nickel nanowire according to claim 1.

8. A molded article comprising the nickel nanowire according to claim 1.

9. A method for producing a nickel nanowire, comprising a step of reducing two or more nickel salts having different dissociation constants and/or counter ions in a reaction solution while applying a magnetic field to obtain the nickel nanowire according to claim 1.

10. The method for producing a nickel nanowire according to claim 9, wherein
the two or more nickel salts comprise nickel chloride and nickel sulfate salts, and a proportion of the nickel chloride to a total of the nickel chloride and the nickel sulfate salts is 70 to 98 mol %.

11. The method for producing a nickel nanowire according to claim 9, wherein
the two or more nickel salts comprise nickel chloride and nickel acetate salts, and
a proportion of the nickel chloride to a total of the nickel chloride and the nickel acetate salts is 70 to 98 mol %.

12. The method for producing a nickel nanowire according to claim 9, wherein
the two or more nickel salts comprise nickel acetate and nickel sulfate salts, and
a proportion of the nickel acetate to a total of the nickel acetate and the nickel sulfate salts is 70 to 98 mol %.

* * * * *